United States Patent [19]

Inskip et al.

[11] Patent Number: 4,874,817

[45] Date of Patent: Oct. 17, 1989

[54] COMPOSITIONS OF IMIDIZED ACRYLIC POLYMERS AND POLYAMIDES

[75] Inventors: Harold K. Inskip, Newark; Marion G. Waggoner, Hockessin, both of Del.

[73] Assignee: E. I. Du Pont De Nemours and Company, Wilmington, Del.

[21] Appl. No.: 476,092

[22] Filed: Mar. 23, 1983

Related U.S. Application Data

[63] Continuation-in-part of Ser. No. 376,230, May 7, 1982, abandoned.

[51] Int. Cl.$^4$ .............................................. C08L 77/00
[52] U.S. Cl. ...................................... 525/183; 525/181

[58] Field of Search ......................... 525/183, 181, 182

[56] References Cited

U.S. PATENT DOCUMENTS 4,415,706 11/1983 Staas ..................................... 525/183

FOREIGN PATENT DOCUMENTS 0049103 4/1982 European Pat. Off. ............ 525/182

Primary Examiner—John C. Bleutge
Assistant Examiner—A. Carrillo

[57] ABSTRACT

Mixtures of imidized acrylic polymers and polyamides are described which have good flexural modulus properties.

7 Claims, No Drawings

COMPOSITIONS OF IMIDIZED ACRYLIC POLYMERS AND POLYAMIDES

CROSS-REFERENCE TO RELATED APPLICATIONS

This application is a continuation-in-part of application Ser. No. 376,230 filed May 7, 1982, now abandoned.

FIELD OF THE INVENTION

This application relates to compositions comprising mixtures of imidized acrylic polymers and polyamides, which have good flexural modulus properties.

BACKGROUND

Imidized acrylic resins are known in the art; see for example, Graves U.S. Pat. No. 2,146,209 and Kopchik U.S. Pat. No. 4,246,374. These resins are prepared by reacting ammonia, or a primary amine with an acrylic polymer such as polymethyl methacrylate to form an imidized acrylic polymer (which are also called polyglutarimides). It is also known to combine imidized acrylic polymers with other materials, such as impact modifiers, pigments, fibers, stabilizers, lubricants etc., as described in said U.S. Pat. No. 4,246,374 at column 4, line 45 to column 5, line 58, and in U.S. Pat. No. 4,217,424 to Weese et al. It is also known to mix imidized acrylic polymers with vinyl chloride polymers and copolymers, as described in Kopchik U.S. Pat. No. 4,255,322 to improve heat distortion temperatures of the vinyl chloride polymers.

It is desirable to increase the stiffness, i.e., the flexural modulus of polyamide molding resins in order to obtain good resistance to cracking or breakage of polyamide molded articles that are subjected to flexing stress. Heretofore, stiffness of such polyamides has been increased by adding such material as glass fibers or mineral fillers. However, modification of properties of polyamides by adding imidized acrylic polymers has not heretofore been known.

SUMMARY OF THE INVENTION

The compositions of this invention comprise about 40–95 volume percent polyamide, preferably 40–80 volume percent, and complementally, about 60–5 volume percent imidized acrylic polymer, preferably 60–20 volume percent. The compositions can be in the form of a blend of resins of each of the two components or can be a molded article containing each of the two components. The compositions can contain additional modifiers such as fillers, reinforcing agents, tougheners, stabilizers and the like up to about 50 volume percent of the total material in the composition.

The invention also includes a process for preparing blends of resins of the two recited components and for molding such blends.

DESCRIPTION

The polyamides used in this invention are well known in the art and embrace semi-crystalline and amorphous resins having molecular weights of at least 15000. They are commonly referred to as nylons. The polyamide resins can be produced by condensation of equimolar amounts of a dicarboxylic acid and a diamine. Preferably the acid will contain from 4 to 12 carbon atoms and the diamine will contain from 4 to 14 carbon atoms. Preferably also the acids and amines will be aliphatic.

Examples of polyamides include polyhexamethylene adipamide (66 nylon), polyhexamethylene azelaamide (69 nylon), polyhexamethylene sebacamide (610 nylon), polyhexamethylene dodecanoamide (612 nylon), polybis(paraaminocyclohexylmethane) dodecanoamide, and the polyamides produced by ring opening of lactams, i.e., polycaprolactam (6 nylon), polylauric lactam, and polyundecanolactam (11 nylon), etc. It is also possible to use polyamides prepared by the co- or ter- polymerization of the above polymers or their components, e.g., an adipic, isophthalic acid, hexamethylene diamine terpolymer. Mixtures of polyamides made may be employed also.

The imidized acrylic resins can be any known in the art. Preferably, they generally have the formula

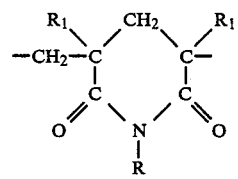

wherein R is hydrogen or hydrocarbyl of 1–20 carbon atoms, preferably alkyl or aryl, and preferably of 1–10 carbon atoms; and $R_1$ is $-CH_3$ or $-H$. The resins of formula I are generally produced from acrylate or methacrylate ester homo- or co- polymers by reacting ammonia or alkyl- or aryl- amines with the polymer, which contains recurring units of

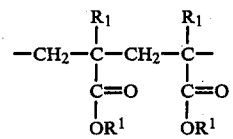

where $R^1$ is lower alkyl, and $R_1$ is $CH_3$ or H. When copolymers are used, they preferably contain at least about 40% by weight methacrylate or acrylate units.

The imidized acrylic resin will contain at least about 10% imide groups, and preferably at least about 40% imide groups, and can be prepared as described, for example, in U.S. Pat. No. 4,246,374 and in U.S. Ser. No. 278,431, filed June 25, 1981 now abandoned. Representative imide polymers include imidized poly(methyl methacrylate) or poly(methyl acrylate), imidized copolymers of either methyl methacrylate or methyl acrylate and comonomers such as butadiene, styrene, ethylene, methacrylic acid, or the like.

The polyamide and the imidized acrylic polymer can be mixed together in any convenient manner to make the compositions of this invention. For example, the two polymers can be dry blended together in granular form by tumbling or stirring. They can be fed separately or after dry blending into a melt blender or extruder in order to achieve melt blending. The emerging blended strand is ordinarily cooled and cut into pellets or cubes.

The following Examples illustrate the invention.

EXAMPLE 1

A nylon 66 polyamide molding resin having a mol. weight of over 15000 ("Zytel" 101 nylon having a number average molecular weight of about 18000 as determined by end group analysis) was dry blended by stirring it with a resin of methyl methacrylate/styrene/- butadiene (75/20/5 wt% ratio) that had been imidized by reaction with ammonia until the nitrogen content of the resin was about 3.7%, as determined by Kjeldahl analysis. The reaction was performed continuously in a static mixer which contained Koch "SMV" mixing elements, at a temperature of about 260° C. and a pressure of about 3000 psi. The dry blended mixture contained 80 wt % (80.4 volume %) polyamide and 20 wt % (19.6 volume %) imidized acrylic resin.

The dry blend was melt blended by feeding it into the feed section of a 28 mm Werner and Pfleiderer twin screw extruder and extruding the melted blend. Upon exiting the extruder die, the emerging strand was quenched in a water bath and then cut into molding pellets of about 3 mm with a conventional strand cutter. The pellets were then dried for about 15 hours (overnight) and were then injection molded into 150" (0.3175 cm) thick test bars with a 6 oz (0.17 kg) Van Dorn reciprocating screw molding machine at a 270°-285° C. barrel temperature and a mold temperature of 90° C.

Some test bars were used dry-as-molded, some were used after conditioning to 50% relative humidity by boiling 24 hours at 121° C. in a 55.6% aqueous potassium acetate, and some were used after conditioning to 100% relative humidity for 24 hours in boiling water. Except for conditioning as above, property data was obtained according to standard ASTM test methods. Tensile strength and elongation were measured according to ASTM D638 with a 0.75 in ×8.5 in (1.9 cm ×21.6 cm) bar at a 2.0 inch/min (5.08 cm/min) pull rate. Flexural moduli were measured according to ASTM D790 with 0.5×5 in (1.27 ×1.27 cm) test bars.

cept the ratio of resins in the blend was 60 wt % (60.6 volume %) polyamide and 40 wt % (39.4 volume %) imidized acrylic resin. Property value data are shown in Table 1.

EXAMPLE 4

The procedure and tests described in Example 1 were carried out using resins described as in Example 1, except the ratio of resins in the blend was 50 wt % (50.7 volume %) polyamide and 50 wt % (49.3 volume %) imidized acrylic resin. Property value data are shown in Table 1.

EXAMPLE 5

The procedure and tests described in Example 1 were carried out using resins described as in Example 1, except the ratio of resins in the blend was 40 wt % (40.6 volume %) polyamide and 60 wt % (59.4 volume %) imidized acrylic resin. Property value data are shown in Table 1.

COMPARISON WITH EXAMPLES 1-5

A. A polyamide described as in Example 1 was extruded and tested as described in Example 1. Property value data are shown in Table 1.

B. A polyamide described as in Example 1 and a methyl methacrylate/styrene/butadiene (75/20/5 wt % ratio) resin as was used to make the imidized polymer described in Example 1 were blended in a wt % ratio of 80 wt % polyamide (80 volume %) and 20% imidized resin as described in Example 1 and tested as described therein. Property value data are shown in Table 1.

TABLE 1

| | Composition | | Dry-as Molded Data | | | | Flexural | Flexural | Heat Deflection |
|---|---|---|---|---|---|---|---|---|---|
| | Vol. % Polyamide | Vol. % Imidized Resin | Tensile Strength (MPa) | Elonga tion % | Notched Izod (J/M) | Flexural Modulus (MPa) | Modulus at 50% Rel. Hum (MPa) | Modulus at 100% Rel. Hum (MPa) | Temperature at 1820 KPa (°C.) |
| Example | | | | | | | | | |
| 1 | 80.4 | 19.6 | 90.8 | 12 | 75 | 3060 | 1530 | 920 | 103 |
| 2 | 70.5 | 29.5 | 87.9 | 23 | 80 | 2980 | 1610 | 1100 | 106 |
| 3 | 60.6 | 39.4 | 89.2 | 29 | 80 | 3230 | 1870 | 1370 | 112 |
| 4 | 50.7 | 49.3 | 89.2 | 26 | 80 | 3210 | 2130 | 1700 | 123 |
| 5 | 40.6 | 59.4 | 88.4 | 4 | 64 | 3260 | 2450 | 2030 | 126 |
| Comparison | | | | | | | | | |
| A | 100 | 0 | 87.6 | 30 | 59 | 2880 | 1140 | 630 | 80 |
| B | 80 | 20 (Unimidized Resin) | 80.2 | 7 | 53 | 2820 | 1360 | 850 | 86 |

Notched Izod impact values were determined according to ASTM D265, except that the values were determined both near the mold gate area and the far area and reported as an average of these values. Heat deflection temperatures under flexural load were determined according to ASTM D648 with the same type specimens used for flexural moduli.

Property value data are shown in Table 1.

EXAMPLE 2

The procedure and tests described in Example 1 were carried out using resins described as in Example 1, except the ratio of resins in the blend was 70 wt % (70.5 volume %) polyamide and 30 wt % (29.5 volume %) imidized acrylic resin. Property value data are shown in Table 1.

EXAMPLE 3

The procedure and tests described in Example 1 were carried out using resins described as in Example 1, ex- As is seen from Table 1 when the polyamide resin in the blend of this invention is nylon 66, notched izod values are higher in every instance than for the polyamide resin alone or for blends containing unimidized resin.

Furthermore it is seen that flexural modulus values of blends of this invention when nylon 66 is the polyamide in the blend are higher in every instance than flexural modulus values for the polyamide alone or for blends containing unimidized resin. Importantly, after conditioning flexural modulus values of blends of this invention did not decrease as rapidly as for the polyamide alone or for blends of the polyamide containing unimidized resin. This makes the blends of this invention better than the polyamide alone or better than a blend containing the unimidized resin for applications involving load bearing parts.

Finally, it is seen the heat deflection temperatures at 1820 KPa are much higher for the blends of this invention in Examples 1-5 than for the polyamide alone or for the polyamide containing unimidized resin. This makes the blends of this invention useful in applications involving exposure to elevated temperatures such as in warm humid climates or as automotive engine parts.

EXAMPLE 6 AND COMPARISON WITH EXAMPLE 6

In Example 6, the same procedure and tests described in Example 1 were carried out using a polyamide resin as described in Example 1, but using as the second resin a resin of polymethyl methacrylate that had been imidized by reaction with ammonia until the nitrogen content of the resin was about 5.4%. The ratio in the blend was 80.6 volume % polyamide (80 wt %). Property value data are shown in Table 2.

In the comparison experiment, the only change made different than in Example 6 was that the polymethyl methacrylate blended with the polyamide was unimidized. Property value data is shown in Table 2.

decrease as rapidly after conditioning. Finally, it is seen that the heat deflection temperature of the blend of this invention is higher.

We claim:

1. A molding blend comprising about 40-95 volume percent of a polyamide resin of molecular weight of at least 15000 and complementally, about, 60-5 volume percent of an imidized acrylic resin, said imidized acrylic resin containing at least 10% by weight recurring imide units of the formula

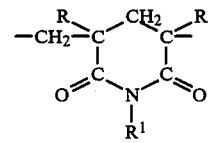

wherein R is hydrogen or hydrocarbyl of 1-20 carbon atoms; and $R_1$ is $-CH_3$ or H.

TABLE 2

| | Composition | | Dry-as Molded Data | | | | Flexural Modulus at 50% Rel. Hum (MPa) | Flexural Modulus at 100% Rel. Hum (MPa) | Heat Deflection Temperature at 1820 KPa (°C.) |
|---|---|---|---|---|---|---|---|---|---|
| | Vol. % Polyamide | Vol. % Imidized Resin | Tensile Strength (MPa) | Elongation % | Notched Izod (J/M) | Flexural Modulus (MPa) | | | |
| Example 6 | 80.6 | 19.4 | 89.4 | 28 | 43 | 3440 | 1760 | 1100 | 88 |
| Comparison with Example 6 | 80.8 | 19.2 | 84.7 | 6 | 21 | 3090 | 1470 | 1000 | 90 |
| Comparison A (same date as in Table 1) | 100 | 0 | 87.6 | 30 | 59 | 2880 | 1140 | 630 | 80 |

It is seen from Example 6 and its Comparison that where a different imidized acrylic resin is used in the blends of this invention than is used in the blends of Examples 1-5, flexural modulus is better than for the polyamide alone and better than for the blend of polyamide and unimidized acrylic.

EXAMPLE 7 AND COMPARISON WITH EXAMPLE 7

In Example 7, the same procedure and tests described in Example 1 were carried out using polycaprolactam (Capron 8200 from Allied Chemical Co.) in place of the polyamide used in Example 1, and using the imidized acrylic resin described in Example 1. The ratio in the blend was 80.4 volume % polyamide (80 wt %) and 19.6 volume % imidized acrylic resin (20 wt %). Property value data is shown in Table 3.

In the Comparison experiment no imidized acrylic resin was used. The polycaprolactam alone was extruded into bars and tested. Property value data are shown in Table 3.

2. The molding blend of claim 1 wherein the imidized acrylic resin is composed of recurring units of imidized methyl acrylate or imidized methyl methacrylate in which at least 40% of the recurring units of the resin are imide units.

3. The molding blend of claim 1 wherein the volume percent of polyamide present is between about 40-80 volume percent, and the volume percent of the complemental amount of imidized acrylic resin present is between about 20-60 volume percent.

4. The molding blend of claim 1 wherein the polyamide is polyhexamethylene adipamide.

5. Process for preparing the molded blends of claim 1 which comprises mixing the polyamide resin and the imidized acrylic resin.

6. Process for forming a shaped article of molding blend of claim 1 which comprises melting said blend, forming said shaped article, and cooling the shaped article.

7. A polymer blend comprising from about 5 to 60 percent by weight of an imidized acrylic polymer, con-

TABLE 3

| | Composition | | Dry-as Molded Data | | | | Flexural Modulus at 50% Rel. Hum (MPa) | Flexural Modulus at 100% Rel. Hum (MPa) | Heat Deflection Temperature at 1820 KPa (°C.) |
|---|---|---|---|---|---|---|---|---|---|
| | Vol. % Polyamide | Vol. % Imidized Resin | Tensile Strength (MPa) | Elongation % | Notched Izod (J/M) | Flexural Modulus (MPa) | | | |
| Example 7 | 80.4 | 19.6 | 83.2 | 87 | 64 | 2940 | 1170 | 1420 | 66 |
| Comparison with Example 7 | 100 | 0 | 76.7 | 66 | 69 | 2880 | 750 | 420 | 61 |

It is seen from Table 3 that in the blend of this invention the tensile strength and elongation is better than for the polyamide alone. It is also seen that the flexural modulus values of the blend of this invention do not taining at least 10 percent by weight glutarimide units, and from about 95 to about 40 percent by weight of a polyamide.

* * * * *